United States Patent [19]

Catlin et al.

[11] 4,018,935
[45] Apr. 19, 1977

[54] COMMINUTED MEAT PRODUCT AND METHOD OF PREPARING SAME

[75] Inventors: Benjamin John Catlin, Rushden; Tegwyn Pierce Williams, Great Doddington near Wellingborough, both of England

[73] Assignee: Thomas J. Lipton, Inc., Englewood Cliffs, N.J.

[22] Filed: Nov. 13, 1975

[21] Appl. No.: 631,450

Related U.S. Application Data

[63] Continuation of Ser. No. 465,576, April 30, 1974, abandoned.

[30] Foreign Application Priority Data

May 4, 1973  United Kingdom ............. 21232/73

[52] U.S. Cl. ................................ 426/646; 426/802
[51] Int. Cl.² ......................................... A23L 1/31
[58] Field of Search .......... 426/104, 646, 656, 574, 426/802, 637

[56] References Cited

UNITED STATES PATENTS

| | | | |
|---|---|---|---|
| 3,083,108 | 3/1963 | Kline et al. ......................... | 426/646 |
| 3,150,985 | 9/1964 | Buscemi et al. ................. | 426/646 X |
| 3,309,207 | 3/1967 | Tuomy et al. ...................... | 426/646 |
| 3,524,746 | 8/1970 | Kelly et al. ..................... | 426/646 X |
| 3,759,723 | 9/1973 | Gunson et al. ................. | 426/646 X |

*Primary Examiner*—Raymond N. Jones
*Assistant Examiner*—Esther L. Massung
*Attorney, Agent, or Firm*—Brumbaugh, Graves, Donohue & Raymond

[57] ABSTRACT

A meat product formed from consolidated comminuted meat, meat anologue or meat, incorporating a proportion of texturized vegetable protein, is improved in respect of heat shrinkage and (in the case of dried meat products) in respect of dehydration/rehydration rates, by incorporating therein a minor proportion of potato pulp.

7 Claims, No Drawings

COMMINUTED MEAT PRODUCT AND METHOD OF PREPARING SAME

The application is a continuation of our copending application Ser. No. 465,576 filed Apr. 30, 1974, now abandoned.

This invention relates to meat products based on consolidated comminuted meat, meat analogue, mixtures of meat and meat analogue, or mixtures of meat and texturised vegetable protein hereinafter referred to as meat for the sake of brevity. Meat analogue means a meat-like product comprising fibres made from vegetable protein and a binder based on vegetable protein. Texturised vegetable protein means products derived from protein-containing materials such as soya meal, by means of heat and pressure, e.g. by extrusion. These meat products are prepared by comminuting meat, moulding it to the desired shape and subsequently heating it to set the protein to a shape retaining matrix. Examples of such products are beefburgers and imitation meat pieces reformed from ground raw meat which may be dried, frozen, canned or used in pies.

Such consolidated meat products have the disadvantage that the meat contracts to form a more closely bound matrix when it is heated either during setting of the meat product or during subsequent cooking by the consumer and when it is dried. When this occurs in the heat setting step prior to drying reformed meat or during the drying step the meat becomes more difficult to dehydrate and rehydrate. When it occurs during cooking by the consumer the product is seen to shrink.

The present invention provides a meat product formed from consolidated comminuted meat comprising potato pulp from which 75–100% of the starch has been extracted, bound within a matrix formed by the comminuted meat.

The potato pulp is generally obtained as a by-product of potato starch production. In this process potatoes are treated firstly to rupture the potato cells and secondly to separate the starch from the pulp. The potato pulp consists largely of ruptured potato cells from which starch has been released and its main constituents are polysaccharides which make up the cell wall such as hemicellulose, cellulose and pectin together with any starch which has not been extracted. The ratio of cell wall polysaccharide to starch in the potato pulp depends on the efficiency of the starch extraction process. Modern extraction plants generally extract at least 95% of the starch from the potato and a typical potato pulp obtained as waste from such an extraction plant contains 30–35% starch and 45–65% cell wall polysaccharide on a dry weight basis. In general the ratio of cell wall polysaccharide to starch should be at least 1:1. The potato pulp is usually cooked and dried before being added to the meat.

We have found that the use of potato pulp reduces the shrinkage taking place during heating or drying of the consolidated comminuted meat. The potato pulp is a very porous material which can absorb or release water without undergoing substantial collapse of its structure. The amount of potato pulp added to the meat is generally 1–10% based on the wet weight of meat equivalent to about 2–25% based on the dry weight of meat.

It has previously been proposed to overcome the above indicated problem of shrinkage in consolidated comminuted meat products by incorporating therein various starchy products, but none of these starchy products have given such satisfactory results as potato pulp when used in accordance with the present invention.

When the invention is applied to the production of dried meat pieces, the comminuted raw meat used is preferably finely ground meat, obtained for example by comminution in a bowl chopper using a gap of about 0.5–1 mm or in a colloid mill or hammer mill producing the same fine degree of comminution. Such finely ground meat will give a product which when consolidated and cooked has a texture resembling that of whole natural meat. Alternatively the comminuted raw meat may be minced through a plate having openings of up to 15 mm if a hamburger texture is desired in the dried product. The potato pulp is preferably added in cooked dry form during or after comminution of the raw meat. When the potato pupl has been distributed throughout the comminuted raw meat, the meat is shaped by filling it into a mould or by extrusion and is then heated to set the meat protein to a shape retaining matrix within which is bound the potato pulp. The shaped meat pieces can then be dried for example by air drying or freeze-drying or a combination of these. The invention is particularly applicable to air-dried pieces where difficulties in drying and rehydration are more liable to occur.

Comminuted cooked meat as well as potato pulp is preferably mixed with the comminuted raw meat in the preparation of a dried product. This gives a more natural meat-like texture to the product and also gives a more easily rehydratable product. Where a cooked meat component is used this preferably retains some of the fibrous structure of the meat and may be obtained by coarsely mincing cooked meat or by comminuting in a bowl chopper using a gap of 2–4 mm which has a rubbing or shredding action on the meat rather than a chopping action. The cooked meat is preferably used in an amount of 20–60% by weight of the total meat content of the mix.

When meat analogues are used as the starting material for the production of dried meat pieces, it is preferable first to grind or mince the fibrous material before mixing it with the binder and other components of the product. When products based on mixtures of meat and meat analogue are desired, it is preferable to prepare separately, ground or minced raw meat and ground or minced meat analogue and then to mix them together with other components of the product.

The amount of potato pulp added to the meat is generally about 1–4% when the dehydrated meat pieces produced are to have a normal rehydration time of about 15–20 minutes. We have found that the use of such amounts of potato pulp leads to a reduction of up to 30% in the time required to dehydrate the meat pieces to a stable moisture content (less than 10%). However, larger amounts of potato pulp, for example up to 10% by weight of the total meat in the mix, can be used if the meat produced is to be very quickly rehydrating, for example within 1–2 minutes. In this case the meat mix which is consolidated and dried preferably contains 40–60% by weight of the total meat content as comminuted cooked meat or vegetable protein fibres and may contain added fat and water. The fat content of the meat mix is preferably 20–30% by weight (added fat and fat present in the meat) and from 5–15% water may be added. The added fat and water are leached out during the heating and drying stages leaving a more porous structure.

Frozen reformed meat pieces may be similarly produced from a mix of finely ground raw meat which optionally contains more coarsely comminuted cooked meat. In this case potato pulp can be added at a level of 1–4% to prevent shrinkage of the reformed meat both during the initial heat-setting step carried out in the factory and the final cooking step carried out by the consumer.

Potato pulp can also be added in an amount of 5 to 10% to hamburgers or beefburgers to prevent shrinkage during cooking. The beefburgers generally comprise raw meat minced through a 8–15 mm plate together with small amounts of onion and other flavourings. The beefburgers may be distributed in chilled or frozen form.

The invention is illustrated by the following examples.

EXAMPLE I

Potato pulp having a solids content of about 15% and obtained as a by-product of the Dutch potato starch industry was cooked in steam (100° C) for 15 minutes. After cooking, excess water was removed by centrifugation and the material was air-dried. The dried potato pulp had the following composition:

|  | Percent by Weight |
|---|---|
| Non-digestible polysaccharide (Cellulose, hemicellulose and pectin) | 56 |
| Starch | 28 |
| Protein | 6 |
| Ash | 1.8 |
| Water | 8 |

Some of the dried potato pulp was used as an aid to dehydration in a dried reformed meat product having the following formulation:

|  | Percent by Weight |
|---|---|
| Ground raw meat | 40.0 |
| Shredded cooked meat | 38.8 |
| Water | 17.4 |
| Salt and flavourings | 1.8 |
| Dried potato pulp | 2.0 |

The ground raw meat was obtained by grinding raw forequarter beef in a colloid mill. The shredded cooked meat was obtained by cooking chunks of forequarter beef and then shredding in a bowl chopper using a wide blade gap. The ground raw meat was mixed for one minute with the shredded cooked meat, potato pulp, salt and flavourings.

The water (liquor recovered from the cooking process) was added and mixing was continued for a further five minutes to provide a sticky coherent mass in which the shredded cooked meat and potato pulp were distributed throughout a matrix of the ground raw meat. The potato pulp formed about 5–6% of the meat product on a dry weight basis.

This meat mix was extruded as a 12 mm thick sheet and was blanched in steam to heat-set the raw meat protein to a shape-retaining matrix. The sheet of heat-set meat was cut into 12 mm cubes which were air-dried at 95° C. The time taken to reach a stable moisture content of 5–6% was 105 minutes. The dried reformed meat dice were rehydrated by cooking for 20 minutes, and had a attractive meat-like texture in which the potato pulp was not discernible.

As a comparison, the experiment was repeated substituting an inert filler (corn flour) for the potato pulp. In this case the drying time of the heat-set reformed meat cubes was 148 minutes.

EXAMPLE II

Dried reformed meat pieces were prepared from a meat mix having the following formulation:

|  | Percent by Weight |
|---|---|
| Minced raw meat | 52.6 |
| Minced cooked meat | 30.0 |
| Dried potato pulp (as used in Example 1) | 8.0 |
| Salt and Flavourings | 1.4 |
| Water | 8.0 |

The minced raw meat was mixed for one minute with the minced cooked meat, potato pulp, salt and flavouring. Water was then added, and mixing was continued for 5 more minutes. The resulting coherent meat mix, in which minced cooked meat and potato pulp were distributed throughout a matrix of minced raw meat, was extruded through a 10 mm mincer plate to provide peices having the dimensions of 10 mm x 5 mm with a length of 6–12 mm. The meat pieces were steam blanched for 5 minutes to heat-set the raw meat protein and were dried to a stable moisture content.

The dried reformed meat pieces were rehydrated by pouring on boiling water. Three experiments were carried out, in which the water was drained off after 20, 40 and 60 seconds respectively. The rehydration ratios (ratio of rehydrated product to dried product) were measured as follows:

| Time of rehydration (seconds) | Rehydration ratio |
|---|---|
| 20 | 2.85 |
| 40 | 3.12 |
| 60 | 3.24 |

All the rehydrated meat pieces had a soft succulent texture. In previous experiments, we have found that meat pieces are generally judged ready to eat when their rehydration ratio is 2.5 or above.

As a comparison, dried meat pieces were prepared using dehydrated potato powder (an effective aid to rehydration, as described in U.K. Pat. No. 1,310,348) in place of the potato pulp. The rehydration ratios in this case were:

| Time of rehydration (seconds) | Rehydration ratio |
|---|---|
| 20 | 2.03 |
| 40 | 2.37 |
| 60 | 2.52 |

The dried meat pieces containing potato powder required about a minute for rehydration to a succulent texture, compared with less than 20 seconds for the meat pieces containing potato pulp.

EXAMPLE III

A coherent meat mix containing shredded cooked meat and potato pulp distributed throughout a matrix of ground raw meat was prepared from the following ingredients by the method of Example I,

|  | Parts by weight |
| --- | --- |
| Ground raw meat | 58.5 |
| Shredded cooked meat | 30.0 |
| Potato pulp | 3.0 |
| Salt and flavourings | 2.7 |
| Water | 8.8 |

The meat mix was extruded as a sheet, heat-set and cut into 12 mm cubes as described in Example I. The reformed meat cubes were suitable for use in frozen products, and on cooking had a meat-like texture in which the potato pulp was not discernible. The yield of heat-set reformed meat cubes was 89% by weight, compared with 80% for similar products containing no potato pulp.

EXAMPLE IV

A beefburger mix was prepared from the following ingredients:

|  | Percent by weight |
| --- | --- |
| Minced raw beef | 80.0 |
| Chopped onion | 10.5 |
| Potato pulp | 6.4 |
| Salt and flavourings | 1.6 |
| Water | 1.5 |

Eight individual beefburgers of diameter 98.4 mm were prepared by consolidating the meat mix in moulds. The beefburgers were kept in chill and then fried until fully cooked. The average diameter of the beefburgers after cooking was 81.0 mm; a shrinkage of 32% in area.

By comparison, beefburgers containing conventional rusk in place of potato pulp were prepared and cooked under the same conditions. The average diameter after cooking in this case was 73.0 mm, a shrinkage of 45% in area.

EXAMPLE V

An air-dried (beef) analogue was prepared from the following main components:

|  | % |
| --- | --- |
| Beef Binder | 53.00 |
| Vegetable (soya) protein fibers | 35.00 |
| Beef fat (rendered) | 5.00 |
| Potato pulp | 7.00 |

The beef binder was made from the following components:

| Solution of vegetable (soya) protein (45% solids) | 40.00 |
| --- | --- |
| Water | 39.50 |
| Suet | 15.00 |
| Meat flavour | 5.00 |
| Caramel | 0.50 |

The protein fibres were soaked for 15 minutes in 1% Caramel, 1% flavour solution surplus solution being removed by spin drying for 30 seconds. The fibres were then reduced to dimensions similar to the dimensions of the shredded cooked meat of Example I by reverse bowl chopping.

The reduced fibres were then mixed with the other main components in a Hobart mixer using a dough hook to give Sample A. Samples B and C were also prepared in which potato pulp was replaced by potato powder in Sample B and Sample C had no potato ingredient added.

Each sample was passed through a 2 × ½ inch cross sectioned extrusion nozzle.

The extrusion characteristics were found to be as follows:

Sample A—Extruded very well giving good evenly extruded sheets which were very uniform in appearance.

Sample B—Extruded, but gave uneven sheets which displayed a bubbling effect.

Sample C—Mass impossible to extrude, the mass was placed in moulds approximately ½ inch deep.

The samples were heat-set in live steam for 15 minutes, cooled to ambient temperatures and then cut by hand into approximately ½ inch cubes, and then air dried in a through draught bin drier at 55° C for 8 hours.

Drying characteristics

A—Evenly and completely dried, porous in nature
B—Very slightly case-hardened, which is unacceptable
C—Completely case hardened, totally unacceptable.

The samples were rehydrated in boiling water for 5, 10 and 15 min and the rehydration ratios are as follows

| Sample Rehydration Time | A | B | C |
| --- | --- | --- | --- |
| 5 minutes | 2.25 | 1.60 | 1.30 |
| 10 minutes | 2.42 | 1.98 | 1.56 |
| 15 minutes | 2.48 | 2.14 | 1.60 |

Rehydration characteristics

A—Completely and adequately rehydrated in the 5 minutes
B—Poorly rehydrated as would be expected from a case-hardened sample
C—Substantially unhydrated, characteristic of a case-hardened sample.

EXAMPLE VI

A series of tests were devised to compare potato pulp with starchy products previously proposed to reduce shrinkage and/or to improve dehydration and rehydration rates of comminuted meat products i.e. tests were made with:
a. Control (no extender)
b. Corn flour
c. Retrograded Corn flour
d. Potato powder
e. Potato pulp.

Comminuted meat products were made from the following components:

| Cooked beef fibre | 40.0 |
| --- | --- |
| Raw beef | 33.6 |
| Rendered fat | 5.0 |

| | |
|---|---|
| Water | 16.3 |
| Salts | 1.0 |
| Colour/flavours | 1.1 |
| Antioxidant | 0.01 |
| Potato pulp or starchy product | 3.0 | and a control was made without any potato pulp or starchy product.

The comminuted meat products were made in the following stages:

| | |
|---|---|
| 1. Cooked meat broken down into fibres | |
| 2. Raw meat milled to a paste | |
| 3. Raw meat, salts, colour/flavours water mixed | 2 min |
| 4. Potato pulp or starchy product added, mixed | 3 min |
| 5. Fat and antioxidant added, mixed | 6 min |
| 6. Mix extruded to form beef pieces heat-set for 10 min - 105° C dry bulb 80° C wet bulb | |
| 7. Air-dried at 55° C. | |

The following results were obtained:

| | |
|---|---|
| 1. Heat Setting Losses % | |
| Control | 6.93 |
| Corn flour | 6.65 |
| Retrograded Corn flour | 3.60 |
| Potato powder | 3.63 |
| Potato pulp | 1.20 |
| 2. Rate of drying A is indicated by times required for 50% weight loss. | |
| | hrs. |
| Control | 4.85 |
| Corn flour | 4.40 |
| Retrograded Corn flour | 5.00 |
| Potato powder | 4.70 |
| Potato pulp | 2.95 |

Rehydration Ratios indicate hydration after 10 mins $$R.R. = \frac{Wet\ wt.}{Dry\ wt.}$$

| | |
|---|---|
| Control | 1.25 |
| Corn flour | 1.46 |
| Retrograded Corn flour | 1.39 |
| Potato Powder | 1.50 |
| Potato Pulp | 1.65 |

Potato pulp gave the most succulent product.

What is claimed is:

1. A shaped meat product comprising comminuted meat and 1–10% by weight dried potato pulp based on the wet weight of the meat, wherein said potato pulp has had 75–100% of its starch removed.

2. The product according to claim 1 wherein the dried potato pulp has a ratio of cell wall polysaccharide to starch of at least 1:1.

3. A dehydrated meat product having a moisture content of less than 10% comprising comminuted meat and about 1–10% by weight dried potato pulp based on the wet weight of meat, wherein said potato pulp has had 75–100% of its starch removed, and said potato pulp being bound within a matrix formed by the comminuted meat.

4. The product according to claim 3 wherein the dried potato pulp has a ratio of cell wall polysaccharide to starch of at least 1:1.

5. A method for reducing shrinkage of comminuted meat products during heating comprising mixing, prior to heating, comminuted meat and 1–10% by weight dried potato pulp based on the wet weight of meat, wherein said potato pulp has had 75–100% of its starch removed.

6. The method according to claim 5 wherein the dried potato pulp has a ratio of cell wall polysaccharide to starch of at least 1:1.

7. A method for reducing the dehydration and rehydration times of a comminuted meat product comprising mixing comminuted meat and about 1–10% by weight of dried potato pulp from which 75–100% of the starch has been removed and which has a ratio of cell wall polysaccharide to starch of at least 1:1, shaping the resulting mixture of meat and pulp, heating the mixture at a temperature sufficient to set the meat protein to a shape-retaining matrix, and drying the shaped product to a stable moisture content of less than 10%.

* * * * *